Dec. 16, 1924.
W. S. McCAMMON
DIRIGIBLE HEADLIGHT
Filed Feb. 1, 1924
1,519,859
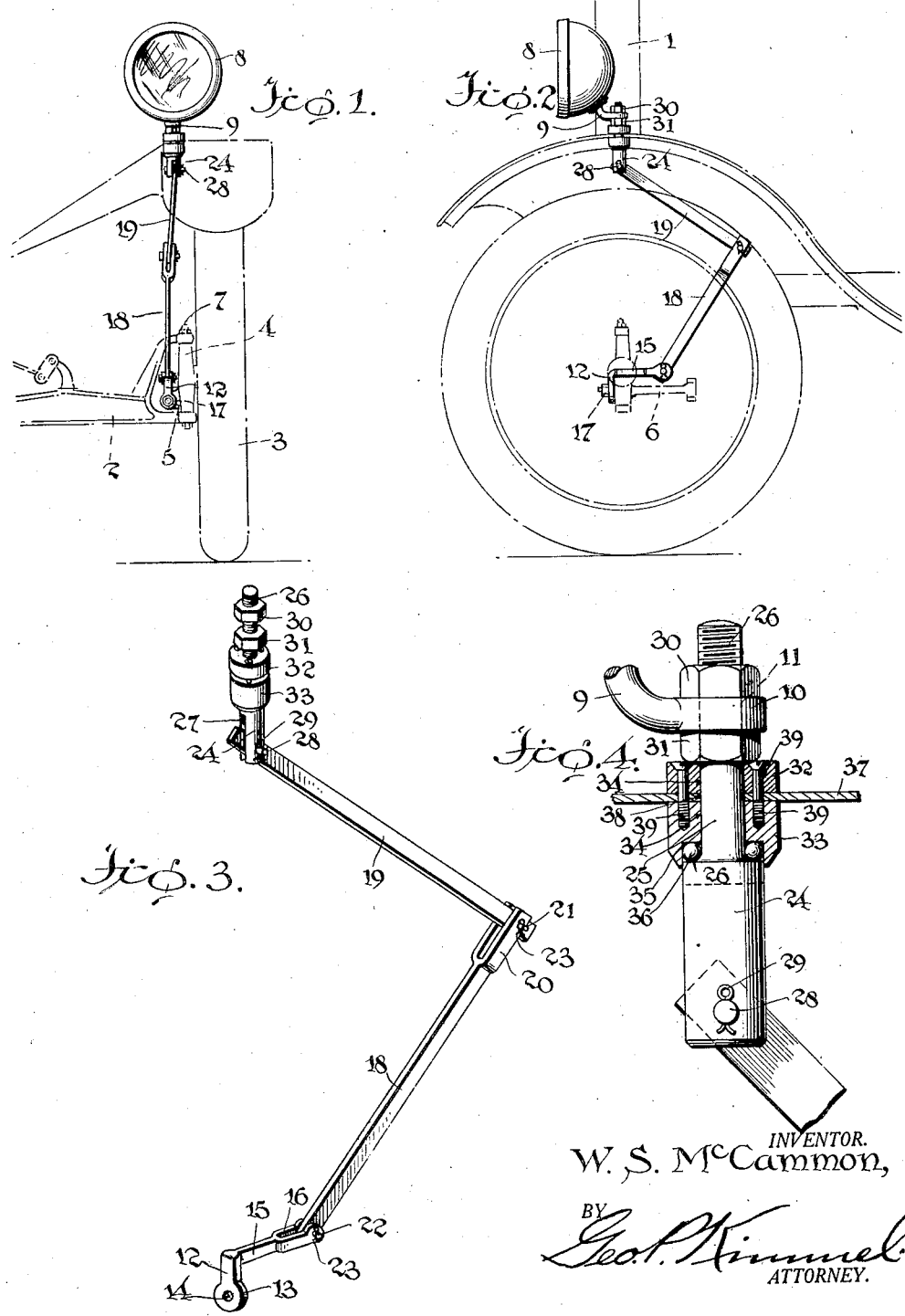
INVENTOR.
W. S. McCammon,
BY
Geo. P. Kimmel
ATTORNEY.

Patented Dec. 16, 1924.

1,519,859

UNITED STATES PATENT OFFICE.

WILLIAM S. McCAMMON, OF SPRINGFIELD, MISSOURI.

DIRIGIBLE HEADLIGHT.

Application filed February 1, 1924. Serial No. 689,865.

*To all whom it may concern:*

Be it known that I, WILLIAM S. McCAMMON, a citizen of the United States, residing at Springfield, in the county of Greene and State of Missouri, have invented certain new and useful Improvements in Dirigible Headlights, of which the following is a specification.

This invention relates to dirigible headlights, more particularly to the shifting mechanism thereof, and is designed primarily for attachment with the spindle body of a motor vehicle of the "Ford" type, but it is to be understood that a headlight shifting mechanism in accordance with this invention can be employed in connection with any type of motor vehicles for which it is found applicable, and the invention has for its object to provide, in a manner as hereinafter set forth, a headlight shifting mechanism including means actuated on the movement of a spindle body associated with the front wheel of the vehicle for synchronously shifting the headlight or lamp in a direction corresponding to the direction in which the front wheel is steered to project the light in the same direction, under such conditions automatically governing the direction in which the light is projected or reflected by the movement of the front wheel instead of by the movement of the vehicle body, so that when turning the vehicle, the light which is projected directly in front of the vehicle when it is driven directly forward will, when the driver undertakes to turn the vehicle to the right or left, be projected in the direction in which the vehicle is steered, thereby enabling the driver to see in which direction he is driving and prevent colliding with objects in the path of travel or driving into dangerous places.

Further objects of the invention are to provide, in a manner as hereinafter set forth, a headlight shifting mechanism which is simple in its construction and arrangement, strong, durable, compact, thoroughly efficient and convenient in its use, readily installed and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a portion of a motor vehicle showing the adaptation therewith of the headlight or lamp shifting mechanism in accordance with this invention. The vehicle is illustrated in dotted lines.

Figure 2 is a side elevation, in dotted lines, of a portion of a vehicle, showing the adaptation therewith of a headlight or lamp shifting mechanism, in accordance with this invention.

Figure 3 is a perspective view of the shifting mechanism.

Figure 4 is a fragmentary view, in section, of the headlight shifting mechanism.

Referring to the drawings in detail, 1 denotes the body portion of a motor vehicle, 2 the front axle, 3 one of the front wheels of the vehicle, 4 the spindle body for the front wheel 3, 5 a lateral lug carried by the spindle body, and 6 a spindle arm which is connected to the lug 5 and provides means for shifting the spindle body 4 on its pivot 7, thereby providing for the shifting or steering of the wheel 3. As is well known, the spindle body of one front wheel of a vehicle is connected to the spindle body of the other front wheel of the vehicle so that when the steering mechanism is actuated, the front wheels will be synchronously steered. The headlight or lamp is indicated at 8 and provided with a curved supporting arm 9, formed with an enlarged free end 10 provided with an opening 11 for a purpose to be presently referred to.

A headlight shifting mechanism in accordance with this invention consists of an actuating element, a shifting device, a rotatable lamp support and a sectional bearing for said support.

The actuating element consists of a vertically disposed arm 12 having an enlarged lower portion 13 provided with an opening 14, and said element further includes a horizontally disposed arm 15, which is formed integral with one face of the arm 12, at the upper part thereof, and further extends rearwardly at right angles with respect to the arm 12. The arm 15 has a yoke-shaped free terminus 16. The arm 12 of the actuating element is arranged forwardly of the lug 5 and is mounted upon and secured to the forward end of the spindle arm 6 which extends through the lug 5 and also through the opening 14. A securing nut 17 is mounted on the forward end of the spindle arm and which clamps the arm 12 of the actuating element against the front face of the lug 5.

The shifting device consists of a lower lever arm 18 and an upper lever arm 19 and each of which permanently extends at an inclination rearwardly with respect to the axle 2. The arm 18 extends upwardly and rearwardly at an inclination and the arm 19 downwardly and rearwardly at an inclination. The upper end of the arm 18 is provided with a yoke 20, through which extends the lower end of the arm 19. The yoke 20, as well as the lower end of the arm 19, is apertured, and extending through the apertures is a pin 21 for pivotally connecting the yoke 20 to the lower end of the arm 19. The lower end of the arm 18 and the end of the yoke 16 are apertured, and extending through said apertured ends is in pin 22 for pivotally connecting the lower end of the arm 18 to the end of the yoke 16. Cotters 23 are provided for maintaining the pins 21 and 22 in position.

The rotatable support consists of a vertical standard of cylindrical contour, and formed of an enlarged lower portion 24 and a reduced upper portion 25 having its upper end terminal provided with peripheral threads 26. The diameter of the upper portion 25 with respect to the lower portion 24 is such as to form a shoulder 26, which is curved and provides a ball-race. The portion 24 is provided with a lengthwise disposed opening 27 which extends from the lower end of the portion 24 and terminates in a point in proximity to the shoulder 26. The opening 27 provides the portion 24 bifurcated. Extending through the opening 27 is the upper end of the lever arm 19, and said lower portion 24, as well as the upper end of the lever arm 19 is apertured, and extending through the apertures of said ends is a pivot pin 28 maintained in position by a cotter 29. The pin 29 pivotally connects the upper end of the lever arm 19 to the lower end of the lower portion 24 of the standard. The upper portion 25 of the standard extends through the opening 11 in the end 10 of the curved supporting arm 9, and engaging with the threaded periphery of the upper portion 25 of the standard is a pair of clamping nuts 30, 31 and which are so arranged that the nut 30 will abut against the upper face of the arm 9 and the nut 31 will be positioned against the lower face of the arm 9, and by this arrangement the arm 9 is clamped to the standard so that when the latter is shifted, in a manner to be presently referred to, the headlight or lamp 8 will be carried therewith.

The sectional bearing comprises an upper section 32 and a lower section 33 and which are arranged in superposed relation, as well as being fixedly secured together. Each of the sections of the bearing is annular in contour and formed with an opening 34. The openings in the said sections align with each other. The lower end of the section 33 is constructed to provide the lower portion of the opening 34 in said section 33 of materially greater diameter than the upper portion and of a diameter slightly greater than the diameter of the lower portion 24 of the standard. The enlarged lower portion of the opening 34 in the section 33 is indicated at 35, and the wall thereof in connection with the upper portion 25 of the standard, as well as the shoulder 26, provides a pocket for bearing balls 36 which surround the upper portion 25 of the standard.

The section 32 is mounted upon the fender 37, and the latter has an opening 38 which registers with the openings 34 in the sections 32 and 33. The section 33 is positioned against the lower face of the fender 37 and has its lower end overlapping the upper end of the portion 24 of the standard. The section 32 is secured to the section 33 by hold-fast devices 39, which are counter-sunk in the sections 32, as well as extending therethrough, and also through the fender 37, and have threaded engagement, as at 39, in the section 33. The hold-fast devices provide means for fixedly securing the sections 32 and 33 to the fender 37. The section 32 is interposed between the nut 31 and fender 37, and said nut 31 is seated upon the top of the section 32.

When two headlights or lamps are employed, each is set up in the same manner as referred to with respect to the headlight or lamp 8, and with the rotatable support for the headlight or lamp 8 associates a shifting device and an actuating element constructed in a manner as referred to.

The nut 31, in connection with the bearing section 32, and the bearing section 33 in connection with the enlarged lower portion 24, of the standard provide means for connecting the standard to the fender and furthermore prevent vertical movement of the standard relative to the fender, but does not interfere with the rotating movement of said standard.

From the foregoing construction and arrangement of elements constituting the shifting mechanism, it is obvious that as the mechanism is connected to the spindle body, that when the latter is shifted through the medium of the steering mechanism of the vehicle, the actuating element will be carried therewith, causing the shifting device formed of the lever arms 18 and 19 to rotate the lamp standard in a direction so that the headlight or lamp 8 will be moved to project the light rays in a direction corresponding to the direction in which the front wheel or wheels have been shifted or turned by the steering mechanism, and although the preferred embodiment of the invention is as illustrated and described, yet it is to be understood that changes in the details of construction can be had which will fall within the scope of the invention as claimed.

What I claim is:—

1. A headlight shifting mechanism for motor vehicles comprising an actuating element including a vertically disposed and a rearwardly extending arm, said vertical arm having means for connecting it with the spindle arm of a steering mechanism, said longitudinal arm extending lengthwise of the vehicle and formed with a yoke-shaped rear end, upper and lower lever arms, lever arms permanently extending in opposite inclinations with respect to each other, said lower arm pivotally connected to said yoke-shaped rear end of the longitudinal arm and having its upper end of yoke-shape contour, said upper arm pivotally connected to the upper end of said lower arm, a rotatable headlight standard provided with means for fixedly securing a headlight to the upper portion thereof, said standard having a bifurcated lower end, and means for pivotally connecting the upper end of the upper arm directly to the bifurcated lower end of said standard.

2. A headlight shifting mechanism for motor vehicles comprising a rotatable headlight standard provided with means for fixedly securing the headlight to the upper portion thereof and further having a bifurcated lower end, a pair of oppositely inclined lever arms, one arranged above the other, said upper arm extending into and pivotally connected directly to the bifurcated lower end of said standard and further having its lower end pivotally connected to the upper end of the lower arm, an actuating element formed of a vertical and a longitudinal arm, said vertical arm having means for connecting it to the spindle arm of a steering mechanism, said lower lever arm having its lower end extending into the rear end of said longitudinal arm, and means for pivotally connecting the lower end of said lower arm to the rear end of said longitudinal arm.

In testimony whereof, I affix my signature hereto.

WILLIAM S. McCAMMON.